United States Patent [19]

Kobayashi

[11] Patent Number: 5,238,421

[45] Date of Patent: * Aug. 24, 1993

[54] PORTABLE APPARATUS HAVING CABLE ELECTRICALLY CONNECTING DISPLAY UNIT AND BASE UNIT

[75] Inventor: Takaichi Kobayashi, Itsukaichi, Japan

[73] Assignee: Kabushiki Kaisha Toshiba, Kawasaki, Japan

[*] Notice: The portion of the term of this patent subsequent to Feb. 25, 2009 has been disclaimed.

[21] Appl. No.: 819,806

[22] Filed: Jan. 13, 1992

Related U.S. Application Data

[63] Continuation of Ser. No. 542,061, Jun. 22, 1990, Pat. No. 5,090,913.

[30] Foreign Application Priority Data

Jun. 23, 1989 [JP] Japan ................................. 1-162224

[51] Int. Cl.⁵ ................................................ G06F 1/00
[52] U.S. Cl. ................................. 439/165; 364/708.1; 16/337; 361/756
[58] Field of Search ................ 439/164, 165; 364/708; 312/7.2; 248/917; 16/223, 337; 361/380, 392-395

[56] References Cited

U.S. PATENT DOCUMENTS

| | | | |
|---|---|---|---|
| 4,571,456 | 2/1986 | Paulsen et al. | 361/386 |
| 4,730,364 | 3/1988 | Tat-Kee | 16/337 |
| 4,864,523 | 9/1989 | Sasaki | 364/708 |
| 5,041,818 | 8/1991 | Liu | 364/708 |
| 5,081,742 | 1/1992 | Kobayashi | 16/337 |
| 5,090,913 | 2/1992 | Kobayashi | 439/165 |
| 5,103,377 | 4/1992 | Kobayashi et al. | 361/380 |

Primary Examiner—Gary F. Paumen
Attorney, Agent, or Firm—Cushman, Darby & Cushman

[57] ABSTRACT

A portable apparatus comprising a base unit and a display unit rotatably connected to the base unit. The base unit has a recess, and the display unit has a first leg portion mounted in the recess. The first leg portion comprises a rear leg segment conjoining a base unit. The first leg portion has a front leg segment fastened to the rear leg segment, defining a guide path between the front leg segment and the rear leg segment. The leg segments, fastened together, form a shaft having a guide path communicating with the guide path. An opening is formed in one of the side walls defining the sides of the recess and also in the wall defining the bottom of the recess, thus allowing access into the base unit. A support segment is removably fitted in this opening, supporting the shaft such that the shaft can rotate. The portable apparatus further comprises a flexible cable which extends from the base unit into the display unit, guided through the opening, the guide path.

3 Claims, 9 Drawing Sheets

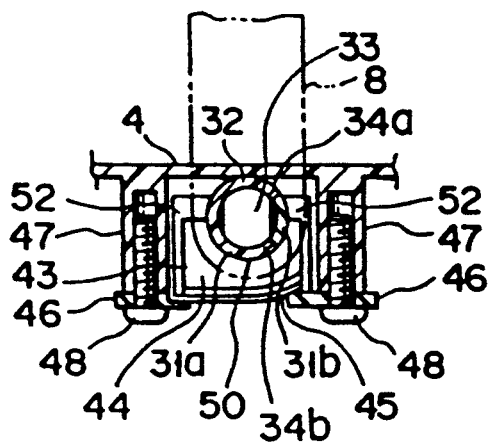
F I G. 6
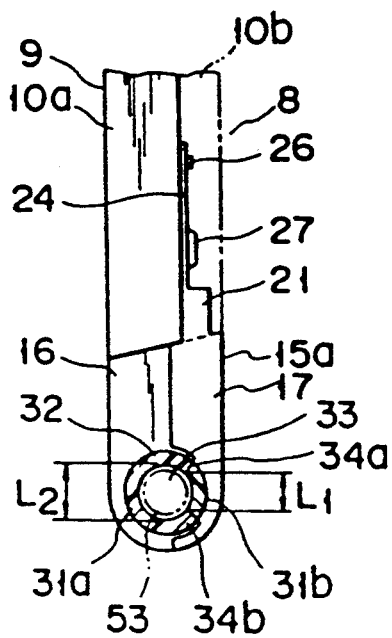
F I G. 7

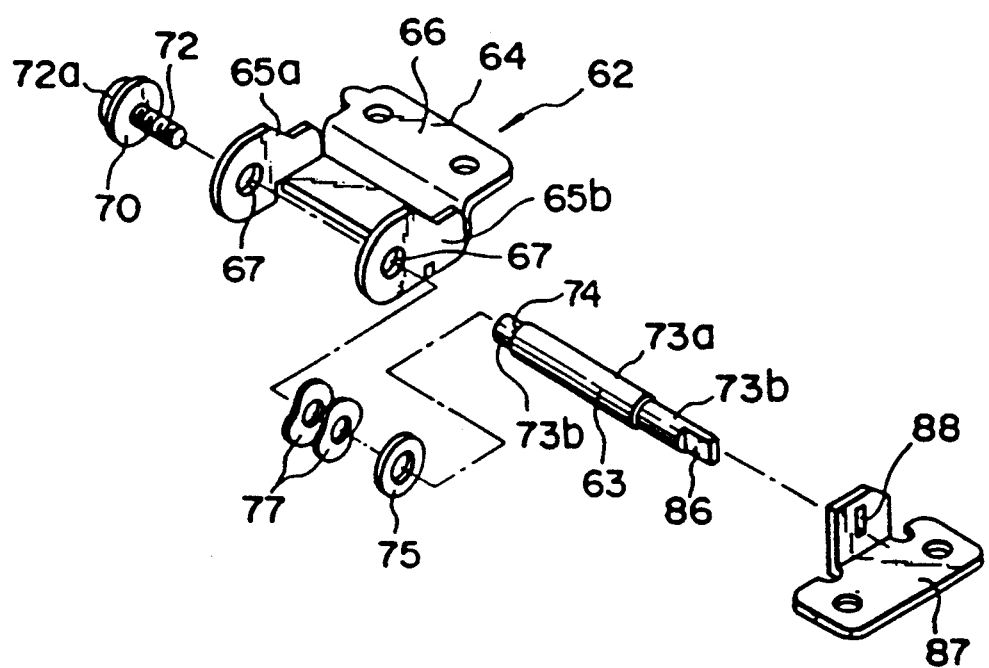
F I G. 11

PORTABLE APPARATUS HAVING CABLE ELECTRICALLY CONNECTING DISPLAY UNIT AND BASE UNIT

This is a continuation of application Ser. No. 07/542,061, filed Jun. 22, 1990, now U.S. Pat. No. 5,090,913.

BACKGROUND OF THE INVENTION

1. Field of the Invention

The present invention relates to a portable apparatus such as a lap-top or portable computer and more particularly to a portable apparatus having a divided portion for suitably guiding a cable electrically connecting a base unit of the computer and a display unit connected to the base unit.

2. Description of the Related Art

U.S. Pat. No. 4,571,456 discloses a portable computer which comprises a base unit, a keyboard attached to the base unit, and a display unit hinged to the base unit by a hinge mechanism. The hinge mechanism connects the display unit to the base unit such that the display unit can be rotated between a closed position where it covers the keyboard and an opened position where it is held up from the keyboard. The hinge mechanism comprises two trunnions horizontally protruding within the housing of the display unit, from the side walls of this housing, and two bearings mounted on the trunnions. The bearings are fitted in the grooves formed in the top surface of the base unit.

The portable computer further comprises a flexible cable connecting the various components located within the base unit to the various components incorporated in the display unit. This cable extends through the hinge mechanism which connects the display unit to the base unit. More specifically, the cable extends from the base unit through the holes made in the bearings and having axes identical to those of the bearings, and further through the holes made in the housing of the display unit, into the display housing. Either bearing is mounted on the trunnion such that its hole is continuous to and coaxial with the hole of the display housing, so that it is easy to guide the cable out of the base unit into the housing of the display unit.

Recently there is a demand for portable computers which are more compact and, thus, more portable. To meet this demand, both the base unit and display unit need to be thin, and the hinge mechanism for connecting the display unit to the base unit must also be thin. As a result, the components of the hinge mechanism, such as bearings or trunnions, should be proportionally thin. The thinner the bearings, the smaller the diameter of their holes. The smaller the diameter of the holes, the more difficult it is to pass a cable through these holes, inevitably reducing the efficiency of assembling portable computers.

SUMMARY OF THE INVENTION

An object of the present invention is to provide a portable electronic apparatus, which facilitates the guidance of cable within the apparatus.

According to the invention, a portable apparatus comprises:
- a display unit including a leg portion having a cable guide path;
- a base unit including a top cover having a leg mounting portion, for mounting the leg portion, having a opening;
- a cover, for covering the opening, having a cable guide portion; and
- a cable, guided through the cable guide path and the cable guide portion, including a first end having a first connector electrically connecting to the display unit and a second end having a second connector electrically connecting to the base unit.

Additional objects and advantages of the invention will be set forth in the description which follows, and in part will be obvious from the description, or may be learned by practice of the invention. The object and advantage of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 6 is a sectional view showing, in detail, the shaft and associated components of the first recess and the first leg portion illustrated in FIGS. 2 and 3;

FIG. 7 is also a sectional view illustrating the shaft shown in FIGS. 2 and 3;

FIG. 11 is an exploded view illustrating the hinge brake mechanism shown in FIG. 9.

DETAILED DESCRIPTION OF THE PREFERRED EMBODIMENTS

Figure 1:
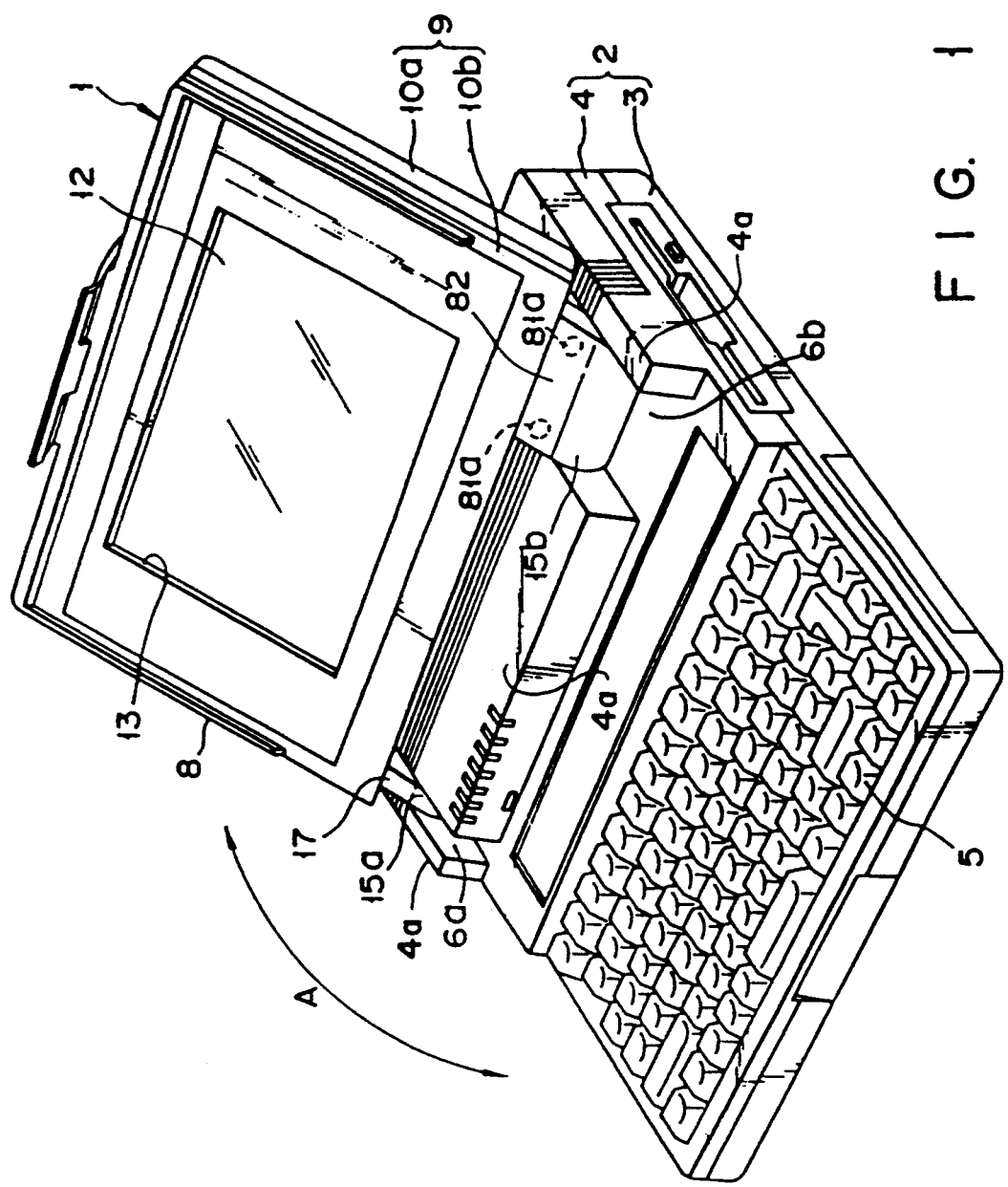
FIG. 1 is a perspective view illustrating a portable computer according to the invention.
Figure 3:
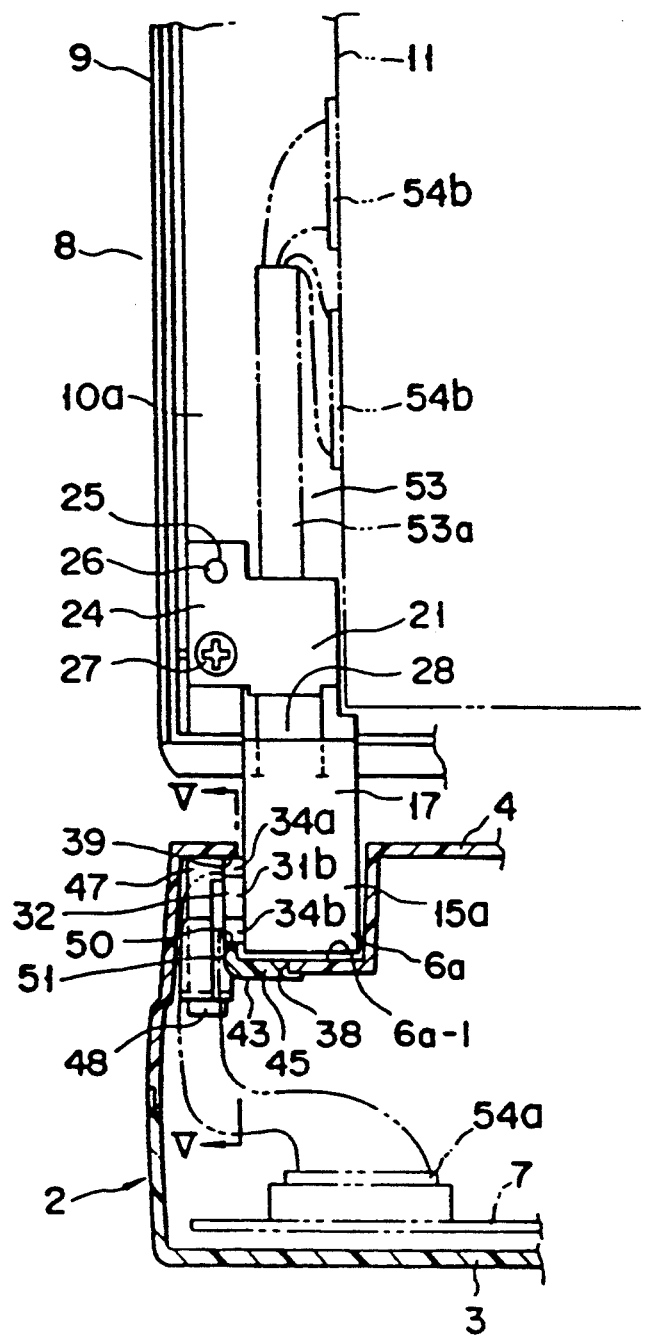
FIG. 3 is a sectional view schematically showing the first recess and the first leg portion.
Figure 4:
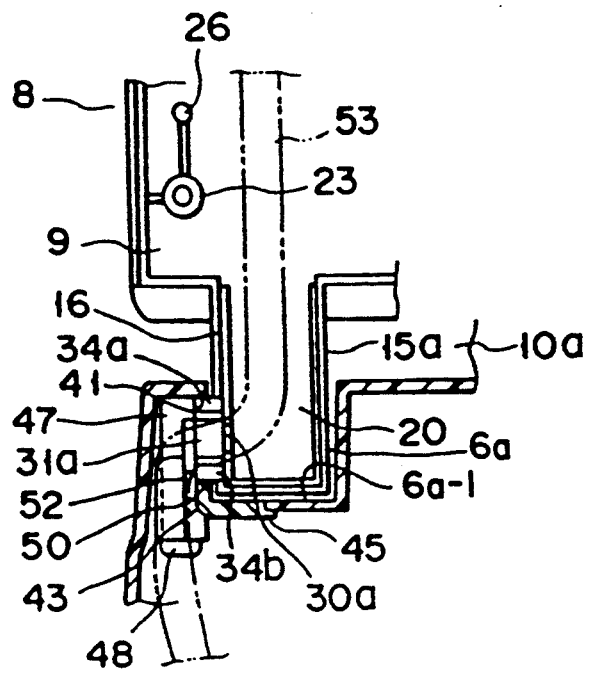
FIG. 4 is also a sectional view of the first recess and the first leg portion, illustrating a cable guided from the base unit into the display unit.
Figure 5:
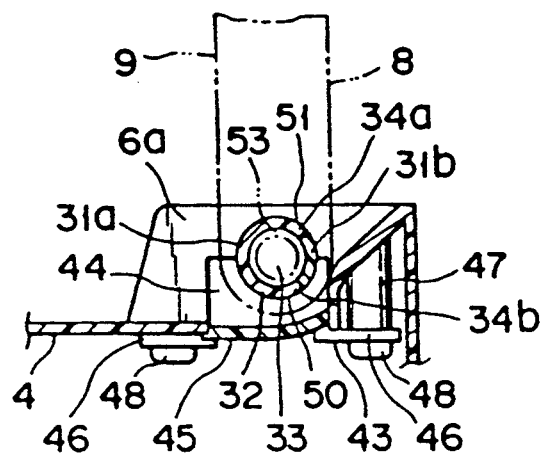
FIG. 5 is a sectional view, taken along line V—V in FIG. 3.

FIG. 1 illustrates a lap-top computer 1. Computer 1 has a base unit 2 made of a synthetic resin and shaped like a thin rectangular box comprising a bottom case 3 which is covered by a top cover 4. A keyboard 5 is attached to the front portion of bottom case 3. The front portion of base unit 2 is thinner than the rear portion of base unit 2. Top cover 4 has a first receiving portion 6a in front left portion of top cover 4 and a second receiving portion 6b in front right portion of the top surface 4a of top cover 4, respectively. As is shown in FIG. 3, a printed circuit board 7, on which are mounted a number of circuit parts (not shown) is incorporated in base unit 2.

As is illustrated in FIG. 1, computer 1 further comprises a flat-panel type display unit 8. Display unit 8 comprises a rectangular housing 9 and a flat liquid-crystal display 11 located within the housing 9. Housing 9 is composed of a base case 10a and a front case 10b, both shaped like a rectangular plate. These cases 10a and 10b are fastened together, by screws (not shown) at their four corners. Liquid-crystal display 11, which has a screen 12, is interposed between cases 10a and 10b. Screen 12 is exposed through a rectangular opening 13 of front case 10b.

As is evident from FIG. 1, display unit 8 is pivotaly coupled to base unit 2. Display unit 8 rotates between a closed position where display unit 8 covers keyboard 5 and an open position for exposing keyboard 5 and screen 12 to operating computer 1, as arrow A. As long as display unit 8 remains in the closed position, its top is at the same level as the upper surface of top cover 4, and its left and right sides are level with those of top cover 4. In this condition, base unit 2 and display unit 8 form a relatively thin box, which is quite portable.

Display unit 8 has a first leg portion 15a and a second leg portion 15b. First leg portion 15a protrudes from a lower-left portion of the housing 9. Second leg portion 15b protrudes from a lower right portion of the housing 9. First leg portion 15a is mounted in first recess 6a and second leg portion 15b is mounted in second recess 6b, respectively.

Figure 2:
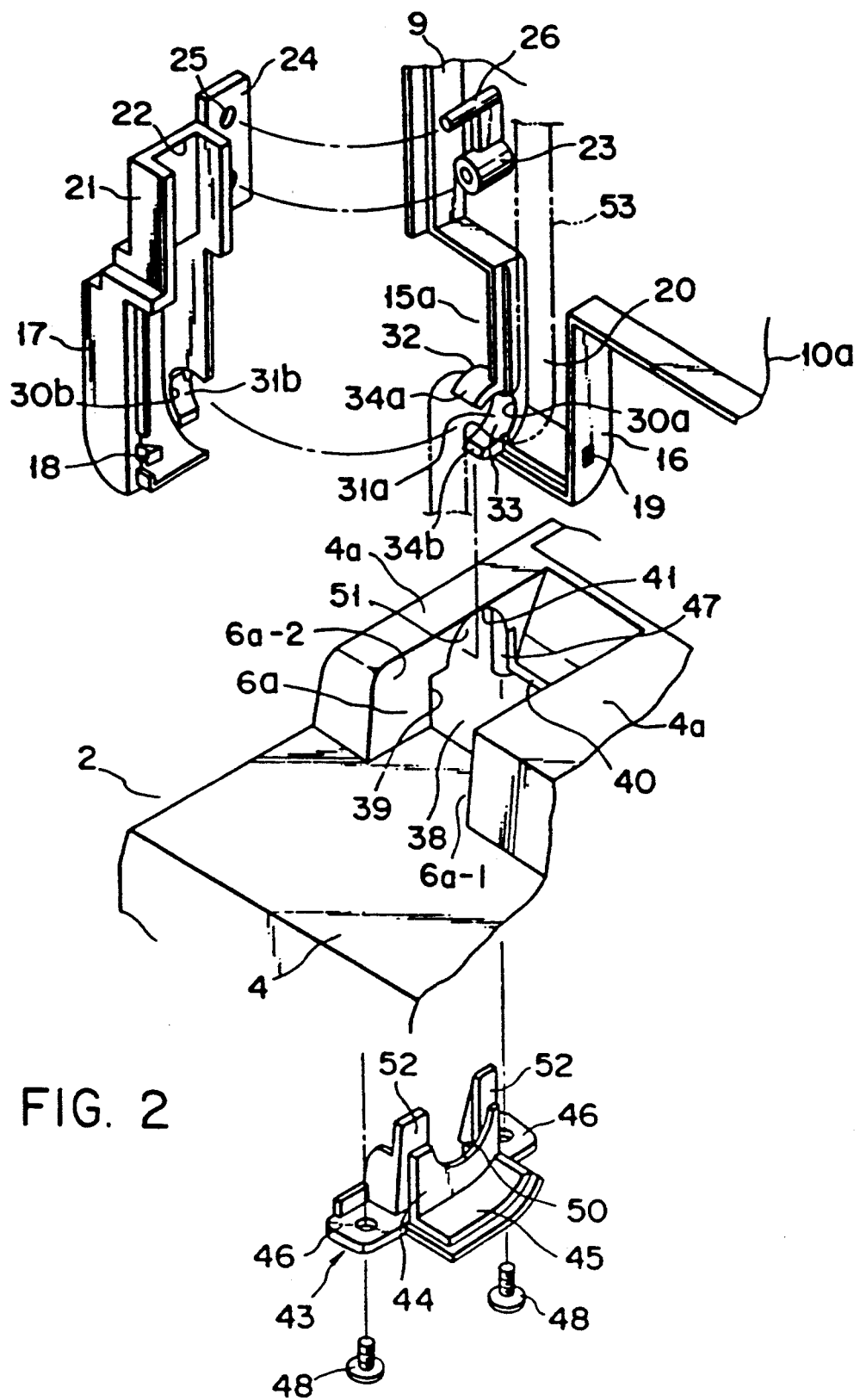
FIG. 2 is a perspective view showing a first recess of a base unit of the computer and an exploded view showing a first leg portion for connecting the display unit to a base unit.
Figure 8:
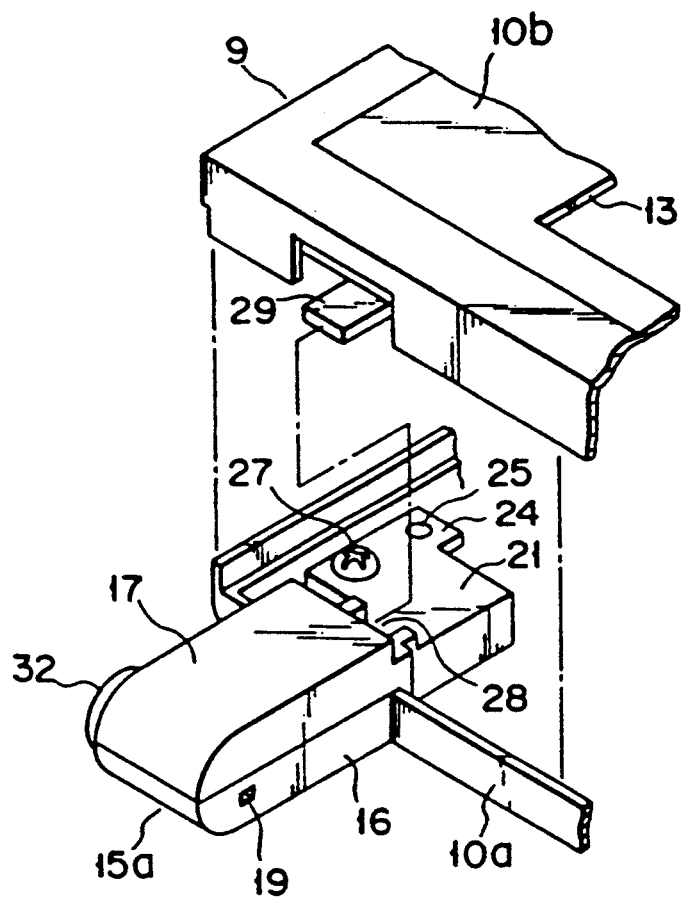
FIG. 8 is an exploded view showing the first leg portion which supports the display unit.

As is evident from FIGS. 2 and 8, first leg portion 15a has a rear leg segment 16 protruding from and conjoining base case 10a and a front leg segment 17 removably fastened to the front of rear leg segment 16. As FIG. 2 clearly shows, front leg segment 17 has a claw 18 projecting from the side which connects to rear leg segment 16. When front leg segment 17 is attached on rear leg segment 16, claw 18 engages a lock hole 19 formed in the inner side of rear leg segment 16, whereby segments 16 and 17 are fastened together, forming first leg portion 15a. Leg segments 16 and 17, thus fastened together, define a cable guide path 20.

The front leg segment 17 also has a guide portion 21 for guiding a cable 53a of a cable assembly 53 into the housing 9. Guide portion 21 has a communication port 22 at its tip. Port 22 opens to the interior of housing 9, thus allowing cable guide path 20 to communicate with the interior of housing 9. Segment 17 further has a fixing tongue piece 24 which is attached to guide portion 21 and aligns with a boss 23 protruding from base case 10a, and has a positioning hole 25. A positioning projection 26, protruding from base case 10a, is inserted in hole 25, thereby aligning front leg segment 17 with rear leg segment 16. As a result of this, leg segments 16 and 17 are firmly connected by a screw 27 set in screw engagement with bosses 23, thus forming leg portion 15a.

As is illustrated in FIG. 8, a stepped portion of front leg segment 17, which is continuous to guide portion 21, has a hole 28 opening into the interior of leg segment 17. A tongue piece 29, protruding from front case 10b, is inserted in hole 28, thus positioning front case 10b.

As may be understood from FIG. 2, leg segments 16 and 17 have, respectively, half-cylinders 31a and 31b, which are situated on the outer sides and connect to each other. Half-cylinders 31a and 31b define U-shaped notches 30a and 30b. These half-cylinders 31a and 31b form a hollow shaft 32 having a cable guide hole 33 in a side surface 15a-1 of the leg portion 15a. Cable guide hole 33 communicates with cable guide path 20 defined by the leg segments 16 and 17.

As is best shown in FIG. 2, half-cylinder 31a of rear leg segment 16 has two arcuate projections 34a and 34b opposing each other and extending to front leg segment 17. Thus, as is illustrated in FIG. 7, the distance L1 between the tips of arcuate projections 34a and 34b is shorter than the inside diameter L2 of hollow shaft 32.

First leg portion 15a extends into first receiving portion 6a of the base unit 2. As is evident from FIG. 2, the first receiving portion 6a has a bottom surface 6a-1, a side surface 6a-2 and an opening 38. Opening 38 has a side opening portion 39 and a bottom opening portion 40. Side opening portion 39 is cut in side surface 6a-2 which is the outermost of the two opposing side surfaces which define the inner and outer faces of the first receiving portion 6a. Bottom opening portion 40 is made in the bottom surface 6a-1 which defines the bottom of the first receiving portion 6a. A receiving section 41 which is the upper edge of section 39 is arcuate, so that shaft 32 is rotatably fitted in opening 38. Thus, as evident from FIG. 2, first leg portion 15a rotatably connects to base unit 2 along the axis of rotation of shaft 32. Also, the side surface 6a-2 of first receiving portion 6a is perpendicular to the axis of rotation of shaft 32.

A cover 43, which is made of a synthetic resin, is located in opening 38, extending from below top cover 4. Cover 43 is fastened to a wall defining a bottom of first receiving portion 6a. Cover 43 has a side cover portion 44 and a bottom cover portion 45 which are fitted in side opening portion 39 and bottom opening portion 40 of opening 38, respectively, with the side wall 44 being disposed perpendicular to the axis of rotation of shaft 32 and two flanges 46, connected to the front and rear edges of side wall 39, which are fastened to bosses 47 protruding downward from the inner surface of top cover 4, by screws 48.

A groove 50, into which shaft 32 is rotatably fitted, is cut in the upper edge of side wall 44 so as to oppose receiving section 41 in base unit 2. Groove 50 and the section 41 form a circular hole 51, through which the shaft 32 rotatably extends. A guide cover portion 52, which is taller than side wall 44 and also has a groove 50, is formed integral with side cover portion 44.

Hole 51 communicates with guide path 20 formed in first leg portion 15a through guide hole 33 formed in shaft 32. Hence, cable guide path 20 and cable guide hole 33 and hole 51 connect the interior of base unit 2 to that of the housing 9. Cable 53a extends through cable guide path 20 and 33 and hole 51, thus electrically connecting printed circuit board 7 to liquid-crystal display 11.

As is shown in FIG. 3, cable 53a is flexible, and has connectors 54a and 54b attached to its ends to form cable assembly. Connectors 54a and 54b are elongated members larger than hole 51. Connector 54a extends into base unit 2 and connected to printed circuit board 7. Connector 54b extends into housing 9 and connected to liquid-crystal display 11.

Figure 9:
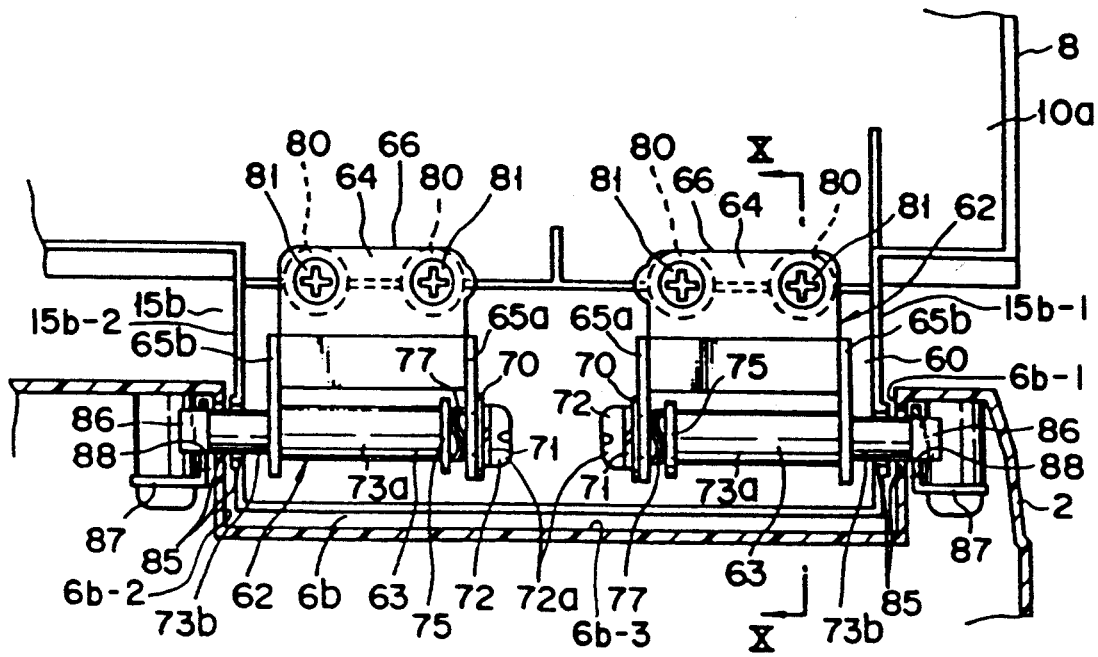
FIG. 9 is a sectional view of a second leg portion and a second recess.
Figure 10:
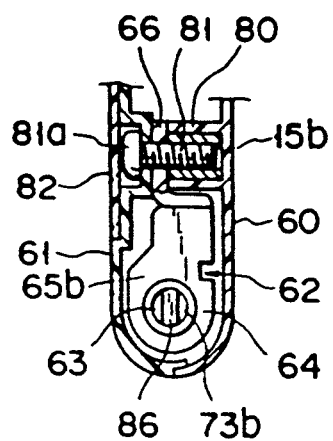
FIG. 10 is a sectional view, taken along line X—X in FIG. 9.

As is illustrated in FIGS. 9 and 10, second leg portion 15b has a rear leg segment 60 conjoining base case 10a and a front leg segment 61 conjoining front case 10b. Second leg portion 15b extends horizontally longer than first leg portion 15a. Second leg portion 15b contains a pair of hinge brake mechanisms 62, which support housing 9 in an arbitrary position between the closed position and the open position.

A first and a second hinge brake mechanisms 62 are located in inner and outer ends of second leg portion 15b, respectively. Hinge brake mechanisms 62 are designed not only to support housing 9, but also to hold housing 9 at any position between the closed position and the open position. Hinge brake mechanisms 62 are identical in structure, and only one of them will, therefore, be described in detail with reference to FIGS. 11 and 12.

Figure 12:
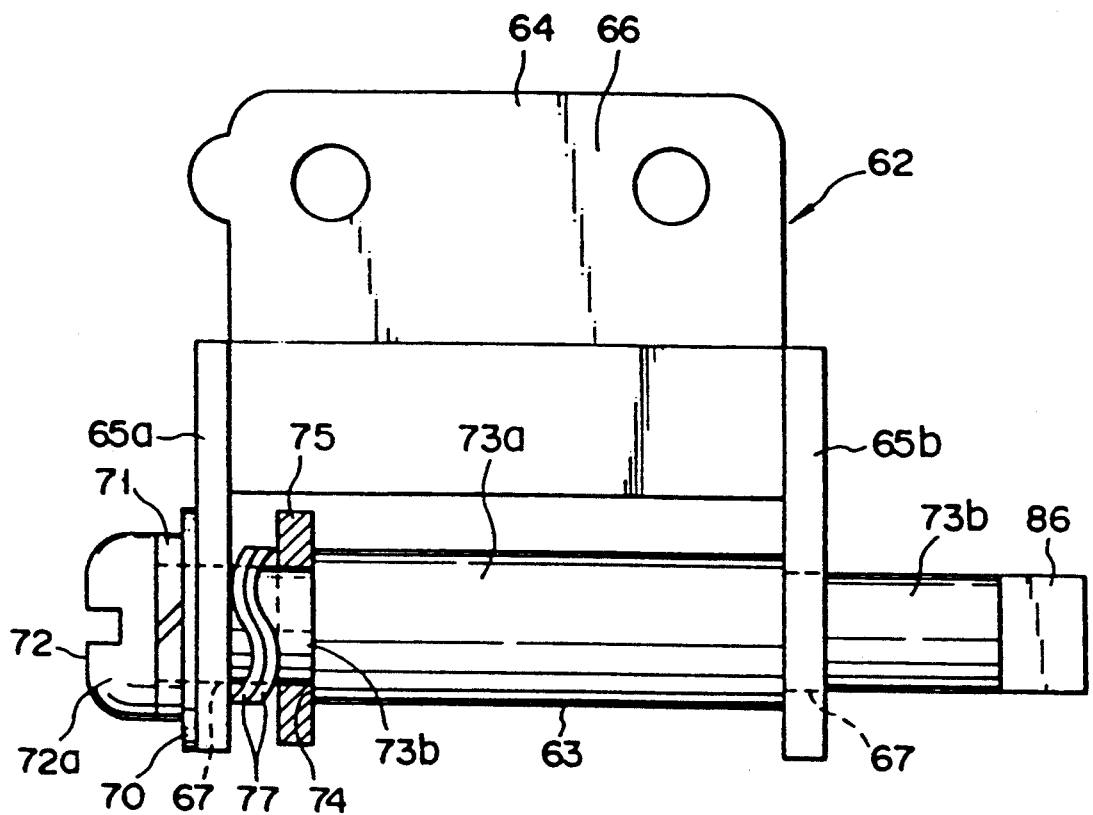
FIG. 12 is a plan view illustrating the hinge brake mechanism shown in FIG. 9.

As is illustrated in FIGS. 11 and 12, each hinge brake mechanism 62 has a straight shaft device 63 and a bracket 64 made of metal and supporting shaft device 63. Bracket 64 comprises a pair of support pieces 65a and 65b spaced apart in the axial direction of shaft device 63, and a fixing section 66 connecting these pieces 65a and 65b. Support pieces 65a and 65b each have a hole 67, and are so positioned that the holes 67 are coaxial. An ends of shaft 63 are rotatably supported in these holes 67.

An end of each shaft device 63 has a screw hole. A screw 72 is inserted in this screw hole, with a plain washer 70 and a spring washer 71 interposed between screw 72 and left end of shaft device 63. Plain washer 70, spring washer 71, and head 72a of screw 72 have diameters larger than those of holes 67. Hence, pain washer 70 abuts on the outer side of support piece 65a, whereby washers 70, 71 and screw 72 prevent shaft device 63 from slipping from hinge brake mechanism 62.

Shaft device 63 has a thick shaft portion 73a and two thin shaft portions 73b extending from the ends of thick shaft portion 73a. A first thin shaft portion 73b is inserted in hole 67 of support pieces 65b. A second thin shaft portion 73a is inserted in hole 67 of support piece 65a. A plain washer 75 having an outside diameter larger than the diameter of thick shaft portion 73a is mounted on thin shaft portion 73b and abuts a right end 74 of thick shaft portion 73a. Two wave washers 77 having an outside diameter substantially the same as the diameter of thick shaft portion 73a are mounted on thin shaft portion 73b. Washers 77 compressed between plain washer 75 and support piece 65a of bracket 64. Two wave washers 77, which function as springs, abut plain washer 75 and support piece 65a, respectively. A friction force is thereby generated between plain washer 75 and bracket 63, restricting the rotation of shaft 64 which is supported by bracket 64.

In this embodiment, two wave washers 77 are used to restrict the rotation of shaft 63. Alternatively, one wave washer, or three or more wave washers may be used for the same purpose in the present invention.

As is shown in FIG. 9, two pairs of bosses 80 protrude from the inner surface of rear leg segment 60. Fixing sections 66 of first and second hinge brake mechanisms 62 are fastened to first and second bosses 80, respectively, by screws 81. Both hinge brake mechanisms 62 are connected to housing 9. As is shown in FIG. 10, one of screws 81 which fasten either fixing section 66 to bosses 80 passes through the hole cut in front leg segment 61. Screws 81 fastens front leg segment 61 to rear leg segment 60. A cover 82 is removably connected to front leg segment 61, thus concealing heads 81a of screws 81.

As is illustrated in FIG. 9, the thin shaft portions 73b of both shaft devices 63 extend through side surfaces 15b-1 and 15b-2 through shaft holes 85 and into base unit 2 through shaft holes 85 made in the side surfaces 6b-1 and 6b-2 of second receiving portion 6b. An end 86 of thin shaft portion 73b which is located within base unit 2 has a polygonal cross section. An end 86 of thin shaft portion 73b is fitted in a corresponding hole 88 made in a support 87 which protrudes downward from the top wall of base unit 2. Thus, shaft device 63 of hinge brake mechanism 62 cannot rotate.

Display unit 8 has leg section 15a connected to the base unit 2 by shaft 32 held in hole 51 as is shown in FIGS. 2 and 3, and has leg section 15b connected to base unit 2 by hinge brake mechanisms 62 as is shown in FIG. 9. Display unit 8 is thus rotatably supported on base unit 2.

It will now be explained how flexible cable 53a, with connectors 54a and 54b attached to opposite ends, is guided from base unit 2 into housing 9 of display unit 8, with display unit 8 disconnected from base unit 2.

First, front case 10b and front leg segment 17 are removed from base case 10a of housing 9. Also, top cover 4 is detached from bottom case 3 and cove 43 is removed from top cover 4, thus allowing access to the interior of base unit 2 through opening 38 which is formed in the side surface 6a-2 which is the outermost of two opposing side surfaces which define the outer and inner faces of first receiving portion 6a, and the bottom surface 6a-1 which defines the bottom of first receiving portion 6a. Opening 38 is allowing large connector 54a, which attaches to printed circuit board 7 to pass through opening 38. The end portion of cable 53a to which the connector 54a is connected is inserted into base unit 2 through opening 38.

Next, cove 43 is fitted into opening 38 from within top cover 4, with cable 53a resting in U-notch 50. Flanges 46 of cove 43 are then fastened to bosses 47 by screws 48. As a result, cove 43 is secured to top cover 4 of base unit 2, whereby U-notch 50 of cove 43 and receiving section 41 of top cover 4 define hole 51. Cable 53a passes through hole 51.

Then, cable 53a is pushed into half-cylinder 31a of rear leg segment 16, more precisely, into the gap between arcuate projections 34a and 34b. Once cable 53a is thus pushed into half-cylinder 31a, it cannot easily slip out of half-cylinder 31a, since distance L2 between the tips of arcuate projections 34a and 34b is shorter than inside diameter L1 of hollow shaft 32. Rear leg segment 16 is inserted into first receiving portion 6a, thus fitting cylinder 31a into hole 51.

Thereafter, cable 53a is guided through rear leg segment 16 to a position above base case 10a of display unit 8. This rear leg segment 16 is then fastened to front leg segment 17 by screw 27. The formation of first leg portion 15a therefore is completed by fastening the segments, and cable 53a is guided into cable guide path 20, through guide portion 21 of front leg segment 17, and, together with connector 54b, from communication port 22, provided at the top of guide portion 21 to a position within the housing 9. This is clearly illustrated in FIGS. 2 and 3. The connector 54a is then electrically connected to display 11 as illustrated in FIG. 3.

When leg segments 16 and 17 are brought into contact with each other, half-cylinder 31b of front leg segment 17 is brought into contact with half-cylinder 31a of leg segment 16, thereby forming hollow shaft 32 having cable guide hole 33. Hollow shaft 32 is then inserted into hole 51 defined by groove 50 of cover 43 and receiving section 41 of top cover 4 as shown in FIG. 3. Consequently, cable 53a passes between top cover 4 of base unit 2 to housing 9 of display unit 8 through cable guide hole 33 of hollow shaft 32 and guide path 20 of first leg portion 15a as also shown in FIG. 3. After leg segments 16 and 17 are connected to each other, first leg portion 15a formed thereof can be inserted into first recess 6a.

Further, connector 54a of cable assembly 53 is electrically connected to printed circuit board 7, before top cover 4 is attached to bottom case 3.

As may be understood from the above, it suffices to pass flexible cable 53a through opening 38 of top cover 4, thereby guiding cable 53a from base unit 2 into display unit 8. Cable 53a need not be passed through guide path 33 or hole 51. For example since opening 38, into which cable 53 is inserted, consists of side opening portion 39 in the side surface 6a-2 of first receiving portion 6a and bottom opening portion 40 in the bottom surface 6a-1 of first receiving portion 6a, the overall size of the entire opening 38 is large as evident in FIG. 2. Therefore, it is easy to insert cable 53a from base unit 2 into display unit 8 through opening 38.

Furthermore, since cable guide hole 33 and hole 51 are formed of respective elements half-cylinder 31a, half-cylinder 31b, receiving section 41, and groove 50 of cover 43, these elements may be separated from each other when cable 53a is to be inserted into cable guide hole 33, provided in hollow shaft 32, and hole 51 as illustrated in FIGS. 2 and 3. Therefore, cable 53a is easily and neatly guided in spite of connectors 54a and 54b fastened to the opposite ends of cable 53, both larger than the diameters of path 33 and hole 51. Such cumbersome manual work as fastening connectors 54a and 54b to cable 53 after guiding cable 53 through first leg portion 15a is completely unnecessary, which facilitates the easy assembling of computer 1.

In this embodiment, front leg segment 17 does not conjoin front case 10b. But even though front leg segment 17 conjoins front case 10b, the same object and advantage will be achieved.

Additional advantages and modifications will readily occur to those skilled in the art. Therefore, the invention in its broader aspects is not limited to the specific details, shown and described herein. Accordingly, various modifications may be made without departing from the spirit or scope of the general inventive concept as defined by the appended claims and their equivalents.

What is claimed is:

1. A portable computer comprising:
   a display unit comprising a flat panel display, a first leg portion having a cable guide path, and a second leg portion having a first shaft hole;
   a base unit comprising a printed circuit board and a top cover having a first receiving portion for receiving the first leg portion and a second receiving portion for receiving the second leg portion, the first receiving portion comprising a bottom surface, a first side surface continuous with the bottom surface, and an opening having a bottom opening portion in the bottom surface and a side opening portion in the first side surface, the side opening portion being continuous with the bottom opening portion, the second receiving portion having a second side surface having a second shaft hole;
   a shaft device pivotally connecting the display unit to the base unit and having a shaft portion passing through the first and second shaft holes;
   a cable assembly for electrically coupling the flat panel display to the printed circuit board, the cable assembly comprising a cable portion having a first end portion, a second end portion, a first connector fixed to the first end portion and a second connector fixed to the second end portion, the cable portion passing through the opening and the cable guide path; and
   an opening cover removably fixed to the first receiving portion and comprising a bottom cover portion covering the bottom opening portion and a side cover portion partially covering the side opening portion, the side cover portion comprising a groove for receiving the cable portion and for aligning the cable portion with the side opening portion.

2. A portable computer according to claim 1, wherein the groove cooperates with the side opening portion to form a cable guide hole when the opening cover is fixed to the first receiving portion.

3. A portable computer according to claim 1, wherein the opening cover is fixed to the first receiving portion after the cable portion is inserted into the opening.

* * * * *